United States Patent [19]

Houston et al.

[11] 3,885,086

[45] May 20, 1975

[54] SPACER-DAMPER ASSEMBLY

[76] Inventors: Herbert James Houston, 1453 Segram Ave., Oakville, Ontario; Kenneth Dale Bolt, 827 Francis Rd., Burlington, Ontario; Adolf Gretzinger, 138 Fallingbrook Dr., Ancaster, Ontario; Robert Gordon Baird, 310 N. Shore Blvd., Burlington, Ontario, all of Canada

[22] Filed: Sept. 4, 1973

[21] Appl. No.: 394,110

Related U.S. Application Data

[63] Continuation of Ser. No. 182,327, Sept. 21, 1971, abandoned.

[30] Foreign Application Priority Data

July 22, 1971 Canada .............................. 118839

[52] U.S. Cl. .............................. 174/42; 174/146
[51] Int. Cl. .............................. H02g 7/14; H02g 7/12
[58] Field of Search ..... 174/40 R, 42, 110 AR, 146; 85/50 R; 151/41, 41.5; 277/207, 211, 213, 227

[56] References Cited
UNITED STATES PATENTS

| 3,057,951 | 10/1962 | Blakely | 174/78 |
|---|---|---|---|
| 3,437,541 | 4/1969 | Cooper et al. | 151/7 X |
| 3,474,184 | 10/1969 | Crosby et al. | 174/42 |
| 3,475,544 | 10/1969 | Reed | 174/42 |
| 3,539,139 | 11/1970 | Eucker | 174/40 R X |
| 3,609,209 | 9/1971 | Houston et al. | 174/42 |
| 3,613,104 | 10/1971 | Bradshaw | 174/42 |
| 3,633,858 | 1/1972 | Houston et al. | 174/42 UX |

FOREIGN PATENTS OR APPLICATIONS

| 570,780 | 2/1959 | Canada | 174/42 |

*Primary Examiner*—Laramie E. Askin
*Attorney, Agent, or Firm*—Mason, Fenwick & Lawrence

[57] ABSTRACT

A cable damper comprises a hollow rigid metallic body consisting of a pair of complementary half shells which are clamped together in edge-abutting relation, a plurality of clamping arms pivotally mounted on the metallic body, and resilient energy absorbing means biasing the arms into neutral positions. The resilient energy absorbing means comprise pairs of annular washers of semiconducting synthetic polyisoprene forming pivotal mountings for the clamping arms.

32 Claims, 14 Drawing Figures

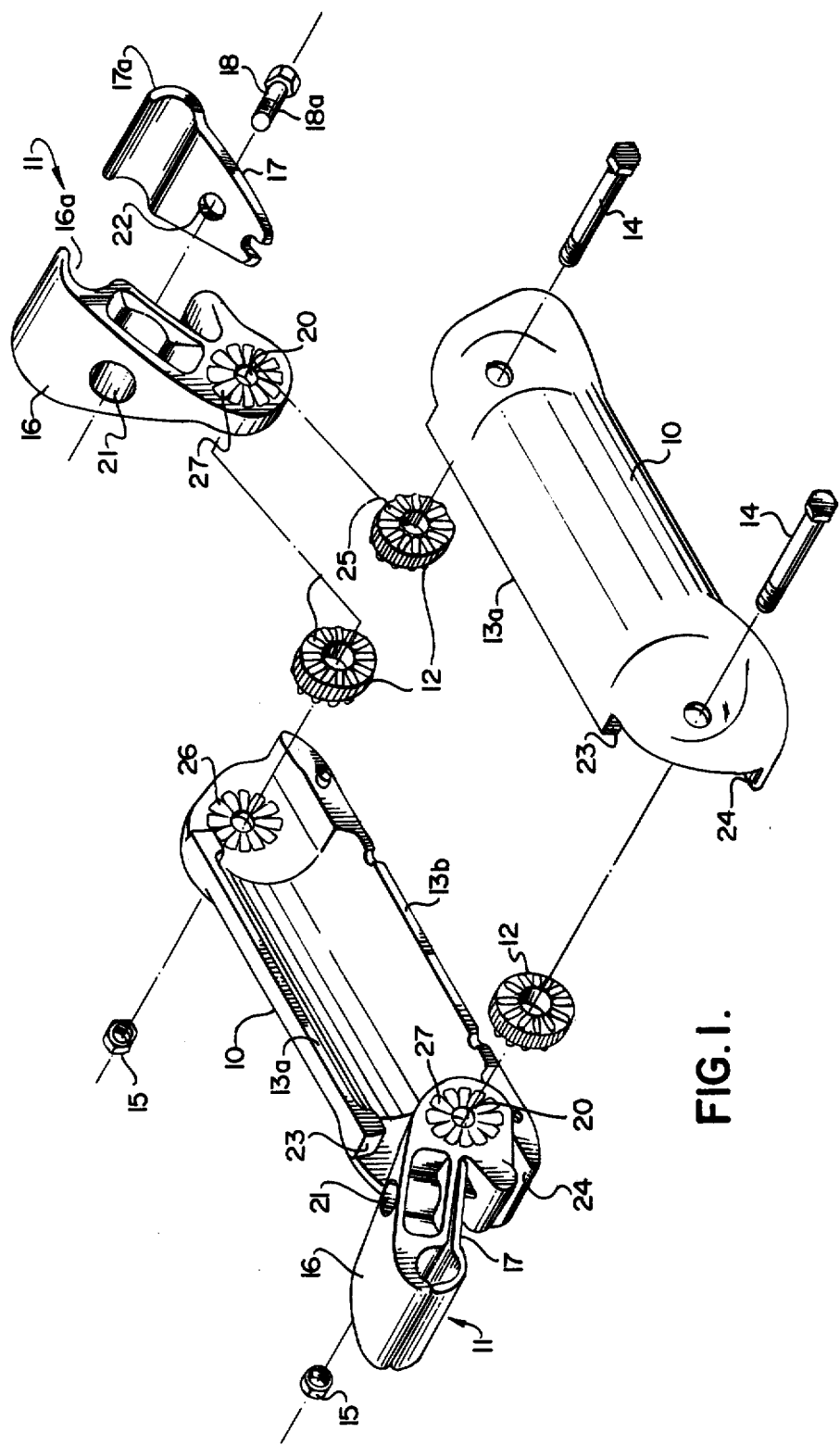
FIG. I.

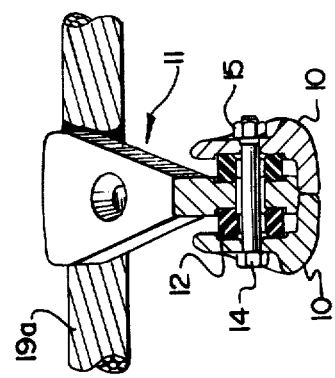
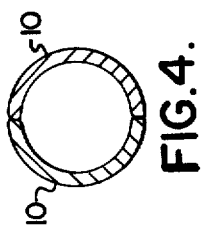
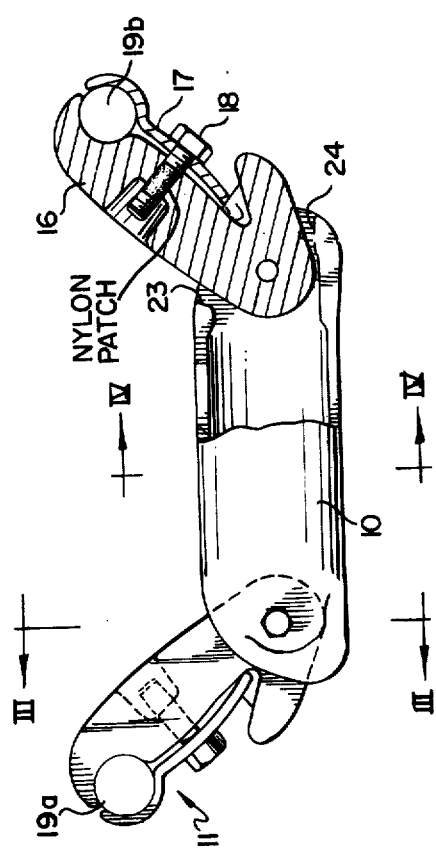

SPACER-DAMPER ASSEMBLY

This is a continuation of application Ser. No. 182,327 filed Sept. 21, 1971, now abandoned.

This invention relates to cable dampers for overhead electrical transmission lines.

When the cables of a transmission line span long distances between adjacent pylons, wind effects on the cables may cause these to vibrate. Vibrations in such cables may take several forms, the type of greatest importance being referred to as aeolian vibration.

In overhead systems having a single wire or cable, aeolian vibrations occur in relatively light winds, usually from one to fifteen miles per hour and result from eddies which form on the lee side of the cable. When the frequency of the eddies coincides with one of the many natural frequencies of the cable, the forces arising from the eddies causes the cable to vibrate generally in the vertical plane. This type of vibration is often present for about 50 percent of the time and if permitted to occur without adequate control, will result in mechanical failure of the wire or cable, sometimes within a very short period of time.

Transmission lines of today often include several sub-conductors for each pole or phase, the sub-conductors being grouped in "bundles." In this type of transmission line, not only does the type of aeolian vibration described above occur, but in addition wind flow over the windward conductor may cause an eddy-vortex system between the adjacent sub-conductors in the same horizontal plane such as will impart a driving force to the leewards conductor or conductors causing these to vibrate or oscillate in the horizontal plane. This vibration once initiated may convert to a vibration in a plane other than the horizontal, for example at 45° to the vertical. This horizontal vibration may be initiated when the ratio of the conductor or cable diameter to the spacing between conductors or cables is less than about thirty to one, or may become extremely pronounced when the ratio is in the neighbourhood of ten to one. The mechanism of the horizontal vibration is very similar to that of the aeolian vibration described above for a single conductor in that the driving force imparted by the eddie-vortex combination will coincide with one of the many natural frequencies of the conductor or cable, causing sustained vibration. The vibrations so caused may be such that the resulting standing waves are in phase for adjacent cables, or the waves may be 180° out of phase. External forces such as ice falling from one sub-conductor and not the other may cause cyclic movement of one sub-conductor with respect to the other in the direction of the longitudinal axes of the cable. This motion is generally known in the industry as differential longitudinal motion. The present invention is so constructed as to accommodate this motion.

Where each pole or phase consists of a bundle of several sub-conductors or cables, it is known to provide spacers situated at intervals along each span, which hold the individual conductors apart and prevent damage which would otherwise occur by cables of a bundle clashing against each other. However, such spacers of themselves will not necessarily prevent the above-described oscillatory motion, which may still occur either in the sub-spans between the spacers, or in the complete span with consequent movement of the spacers.

To prevent sub-span clashing of the cables, the spacers must be placed at intervals along the span usually between 200 and 300 feet apart, with shorter spans adjacent the suspension points. The provision of such spacers at these intervals is essential to prevent the conductors from clashing, quite apart from any damping requirement, but it is convenient to use these spacers also as dampers rather than to use larger and less manageable dampers situated only at the suspension points. Spacers which act as dampers for this purpose are known and which are designed to be spaced along the span between the suspension points, and such spacer dampers differ from devices which are concentrated at the suspension points at the ends of a span.

Known spacer dampers include devices which dissipate vibrational energy by twisting the cables or causing the cable strands to rub against each other and frictionally dissipate the energy of vibration. There are also known spacer dampers for attachment to a group of parallel cables of the same pole or phase, such dampers generally having a main body attached to the cables by short arms having cable clamps, the arms being connected to the main body by energy absorbing devices which allow limited angular movement between the arms and the body while absorbing the energy of such movements, and so damping the vibrations. The present invention relates to cable dampers of this latter type.

According to one aspect of the present invention there is provided a cable damper for an aerially suspended conductor in bundled configuration comprising a rigid main body having a plurality of clamping arms pivotally connected thereto with resilient energy absorbing means adapted to damp vibrational movements of the clamping arms, characterized in that the main body consists of a pair of complementary half shells clamped together in edge abutting relation by clamping bolts.

This construction affords three main advantages: first, the hollow body formed by the half shells provides an internal cavity for the accommodation and location of the resilient energy absorbing means; second, the split body construction greatly facilitates assembly and repair, and provides easy access for the replacement of parts; and third, if the half shells are made from light metal castings, more particularly aluminum castings, it becomes an easy matter during manufacture to control such items as external contours and surface roughness, for obtaining corona-free performance, and to control the body weight in accordance with a desired natural frequency of vibration.

In a preferred embodiment of the invention each clamping arm comprises a pair of clamp members adapted to hold a subconductor therebetween, and means for securing the clamp members together, one of the clamp members being a rigid unitary body, for example, a one-piece aluminum casting, pivotally mounted by the resilient energy absorbing means, and the other clamp member being a resilient plate or leaf spring-like section adapted to be secured to the first member by said securing means. The arrangement is such that the clamp members maintain a continuously adequate clamping pressure on the sub-conductor notwithstanding thermal cycling effects and the like, which in the past have reduced the effectiveness of such clamps.

According to another aspect of the invention there is provided a cable damper for an aerially suspended conductor in bundled configuration, comprising a rigid metallic body having a plurality of metallic clamping arms adapted to engage respective sub-conductors of the conductor bundle, said clamping arms being pivotally connected to the main body by pivot mountings adapted to permit pivotal movement of the clamping arms about predetermined axes parallel to the sub-conductors, said pivot mountings including resilient energy absorbing means adapted to damp vibrational movements of the clamping arms, and each said energy absorbing means comprising a replaceable element of semiconducting synthetic polyisoprene which is frictionally engaged between relatively movable surfaces of a clamping arm and the main body. The resilient elements preferably take the form of annular washers, which are mounted on and located by the pivotal mountings.

Extensive research and a comprehensive testing programme covering the spectrum of available elastomers has revealed that synthetic polyisoprene stands out as a singularly good material for use in this connection. The characteristics of synthetic polyisoprene which render it particularly suitable for this purpose and which, taken in combination, reveal its superiority over other elastomers, are its particularly high wear resistance, its ability to be made semi-conducting without adverse side effects or loss of wear resistance, its ability to remain functional at very low temperatures and its capability of absorbing and dissipating vibrational energy.

According to yet another aspect of the present invention, therefore, there is provided a resilient energy absorbing element for use in a cable damper, comprising an annular washer of semi-conducting synthetic polyisoprene.

In order that the invention may readily be understood, several embodiments thereof will now be described by way of example with reference to the accompanying drawings, in which:

FIG. 1 is an exploded perspective view showing the components of a first cable damper according to the invention, the cable damper being adapted for use with an aerially suspended conductor comprising two sub-conductors in bundled configuration;

FIG. 2 is a part-sectional elevation of the cable damper shown in FIG. 1;

FIG. 3 is a section on line III—III in FIG. 2;

FIG. 4 is a section on line IV—IV in FIG. 2, the figure showing only those parts which lie in the plane of the section;

Figure 5:
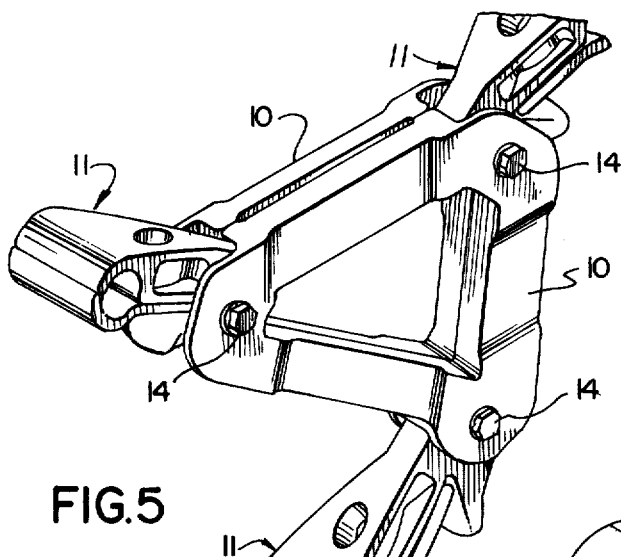
FIG. 5 is a perspective view of a second cable damper according to the invention, the cable damper being adapted for use with a conductor comprising three sub-conductors.

Referring to FIGS. 1 to 4, the first cable damper essentially comprises a hollow rigid main body consisting of a pair of metallic half shells 10 clamped together in edge abutting relation, a pair of clamping arms 11 pivotally mounted on the main body, and resilient energy absorbing means in the form of four annular washers 12 frictionally engaging the clamping arms to bias the latter into respective neutral positions. Each of the half shells 10 is an aluminum casting formed with a pair of horizontally extending edges 13a, 13b which abut against the corresponding edges of the other half shell when the half shells are clamped together. The half shells 10 are clamped together by means of a pair of clamping bolts 14, the bolts 14 being secured by nuts 15. Each of the clamping bolts 14, being connected to and extending between the half shells, acts as a form of pivot bolt forming part of the pivotal mounting for a respective clamping arm 11 and defining a predetermined pivotal axis extending parallel to a sub-conductor held by the arm. It should be noted from FIG. 4 that under normal conditions the bolt 14 will not come into physical contact with either the arm 16 or the washer 12. The bolts in the present invention are purposed essentially to hold the body sections 10 together and are adapted to pass through both the arms 10 and the washers 12 without contact in any meaningful or operable sense, there being an annular air gap between each of the washers and the respective bolt. Indeed, contact by the bolts could negate the longitudinal flexibility required to accommodate differential longitudinal motion of the conductors. The essential pivots in the damper assembly are the washers 12.

Each of the clamping arms 11 comprises a first, rigid, clamp member 16, a second, resilient clamp member 17, and a securing bolt 18 for clamping the members together. As shown in FIG. 2, and in greater detail in FIG. 9, each pair of clamp members 16, 17 is adapted to engage a respective one of a pair of longitudinally extending sub-conductors 19a, 19b of a conductor bundle to hold the sub-conductor therebetween, the rigid main body formed by the shells extending transversely with respect to the sub-conductors and the pivotal axes formed by the clamping bolts 14 lying in a plane which is parallel to the common plane of the sub-conductors. The rigid clamp member 16 is a unitary body constituted by an aluminum casting, formed with a cylindrical through-passage 20 to receive the bolt 14, and formed with a threaded hole 21 to receive the securing bolt 18. The securing bolt 18 is formed with a screw-threaded portion 18a provided with a nylon patch; the nylon patch provides an interference fit between the threads of the bolt 18 and hole 21, such that positive torque is always required to turn the bolt even when the bolt is not under axial tension. The securing bolt is made captive by staking the end of the bolt.

The resilient clamp member 17 is a steel plate of leaf spring-like section, formed with a hole 22 to locate the securing bolt 18, and formed with a conductor-engaging portion 17a which co-operates with a conductor-engaging portion 16a of the rigid clamp member 16. The arrangement ensures that an adequate clamping pressure is maintained at all times.

The clamping arms 11 are biased into their neutral positions which, as shown in FIG. 2, are such that the arms are inclined to the common plane of the sub-conductors 19a, 19b. Preferably the neutral positions of the clamping arms are such that the axis of each arm passing through the centre of the clamped sub-conductor and the pivotal axis of the arm lies at an inclination of between 30° and 60° to the common plane of the sub-conductors, 45° being the optimum angle of inclination. If the angle of inclination is less than 30°, transverse vibrations may be insufficiently suppressed, in the case of two subconductors, and if the angle of inclination is greater than 60°, aeolian vibrations may be insufficiently suppressed.

The clamping arms are, of course, capable of pivotal movement about their respective pivot bolts 14, the range of pivotal movement being limited by abutment edges 23, 24 defined by openings in the main body through which the clamping arms extend. Each of these openings is provided by the registration of a pair of co-operating recesses formed in the edges of the half shells 10, as will be readily apparent from the exploded view shown in FIG. 1. The abutment edges 23 and 24 are also effective in limiting the pivotal movement of the arms 11 when the bundle of sub-conductors is subjected to high forces of mutual attraction caused by short circuits on the transmission system. Such forces may be of sufficient magnitude that they could cause damage to the washers if not properly controlled.

Figure 7:
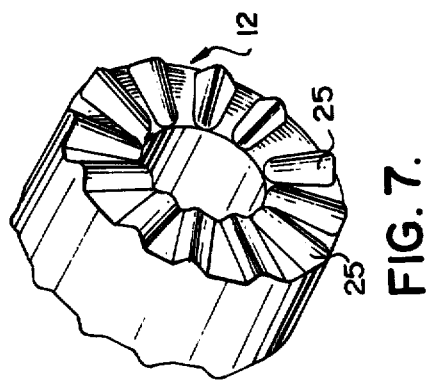
FIG. 7 is a perspective view of an energy absorbing washer according to the invention.
Figure 8:
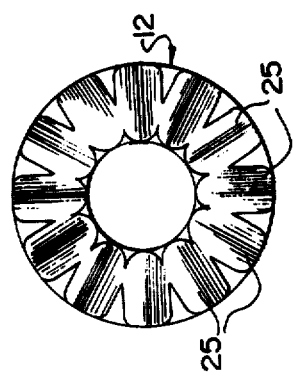
FIG. 8 is an end elevation of the washer shown in FIG. 7.

The resilient energy absorbing means which bias the clamping arms into their neutral positions are incorporated in the pivotal mountings for the arms. Each such means comprises a pair of resilient washers 12 of elastomeric material, the configuration of an individual washer being shown in detail in FIGS. 7 and 8. The washers 12 of each pair are mounted on a respective one of the clamping bolts 14 and located thereby between opposing surfaces of a clamping arm and the respective adjacent surfaces of the half shells in the area of the pivotal connection, so as to prevent contact of said surfaces in operation. The faces of the washers are provided with deformations, in the form of radial corrugations 25, which grip with mating corrugations 26 on the respective engaging surfaces of the half shells 10, and with mating corrugations 27 on the respective engaging surfaces of the clamping arms 11, respectively.

Each washer is under axial compression between the opposed surfaces which it engages, that is to say, the washer is of sufficient thickness to provide a compression factor to preclude slippage between the faces of the washer and the engaging surfaces of the clamping arm and half shell. Thus, when pivotal movement of the clamping arm occurs, the washer is subjected to torsional stress and tends to restore the clamping arm to its neutral position. In this way, depending on the energy dissipating capability of the washers, vibrational energy due to transverse and/or aeolian vibrations in the sub-conductors is absorbed and such vibrations are damped. In addition, the washers are by virtue of their resilience in the axial direction adapted to absorb and dissipate vibrational energy due to differential vibratory motion of the sub-conductors in the axial direction.

In the past resilient washers of this general kind have been made of natural or silicone rubber. Natural rubber, although being a satisfactory material at medium temperatures, can only have good low temperature properties imparted or are only useful if extreme care and dilligence is used in selecting the particular rubber components for use as energy absorbing washers with the apparatus of the present invention. Natural rubber is also susceptible to attack by ozone. By virtue of the fact that synthetic polyisoprene is a synthetically derived compound, the characteristics such as tensile strength, tear resistance and the resultant wear characteristics can be readily optimised. However, natural rubbers have to be selected with extreme care to approach the same characteristics and performance.

Silicone rubber, on the other hand, displays excellent low temperature resilience and resistance to ozone, but has a relatively poor wear resistance. Furthermore, when silicone rubbers are compounded to be made semiconducting their physical properties in terms of the characteristics desired for the present invention are seriously degraded. Therefore, silicone rubber washers are used in the non-conducting state. The tensile and tear properties of synthetic polyisoprene are also considerably better than those of the best compounded silicone rubber. However, a significant disadvantage in the use of silicone rubber is the characteristic it exhibits of taking on a permanent set when subjected to cyclic torsional deformation when under compression. The phase "hysterisis set" has been coined to describe this phenomenon. In actual tests conducted the compression set was sufficient after 25,000 cycles to completely negate the 25 percent compression introduced in the washer when the test damper was assembled. This phenomenon does not occur with synthetic polyisoprene compounds. The necessity of using auxiliary components to provide a charge leakage path is a serious disadvantage; as is well known in the art, metallic springs are prone to premature fatigue failure, while semiconducting sleeves have a tendency to "lubricate" the metallic surfaces which they engage.

In the preferred embodiments of the present invention the resilient washers are of semi-conducting polyisoprene.

Figure 6:
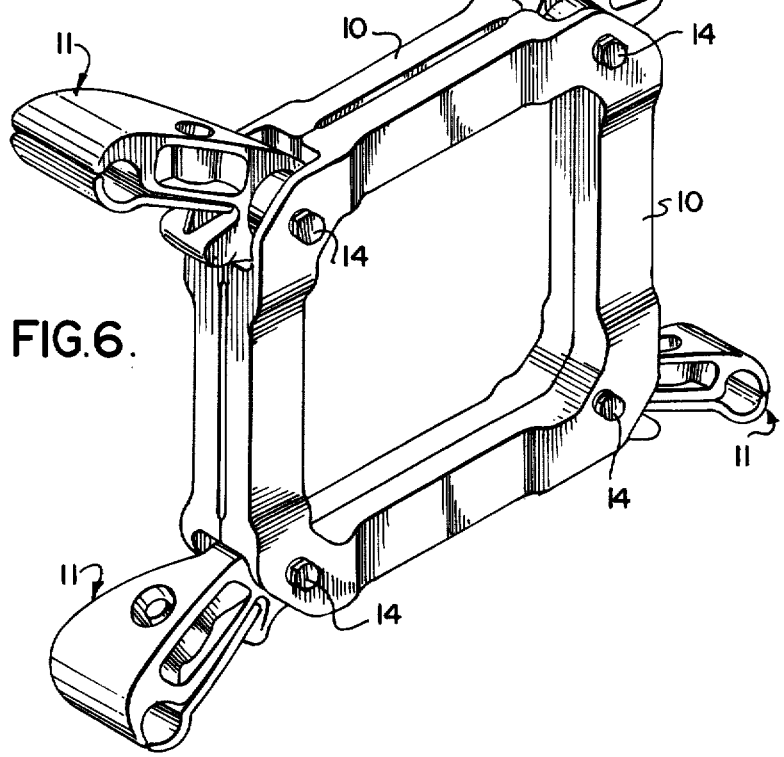
FIG. 6 is a perspective view of a third cable damper adapted for use with a conductor comprising four sub-conductors.
Figure 10:
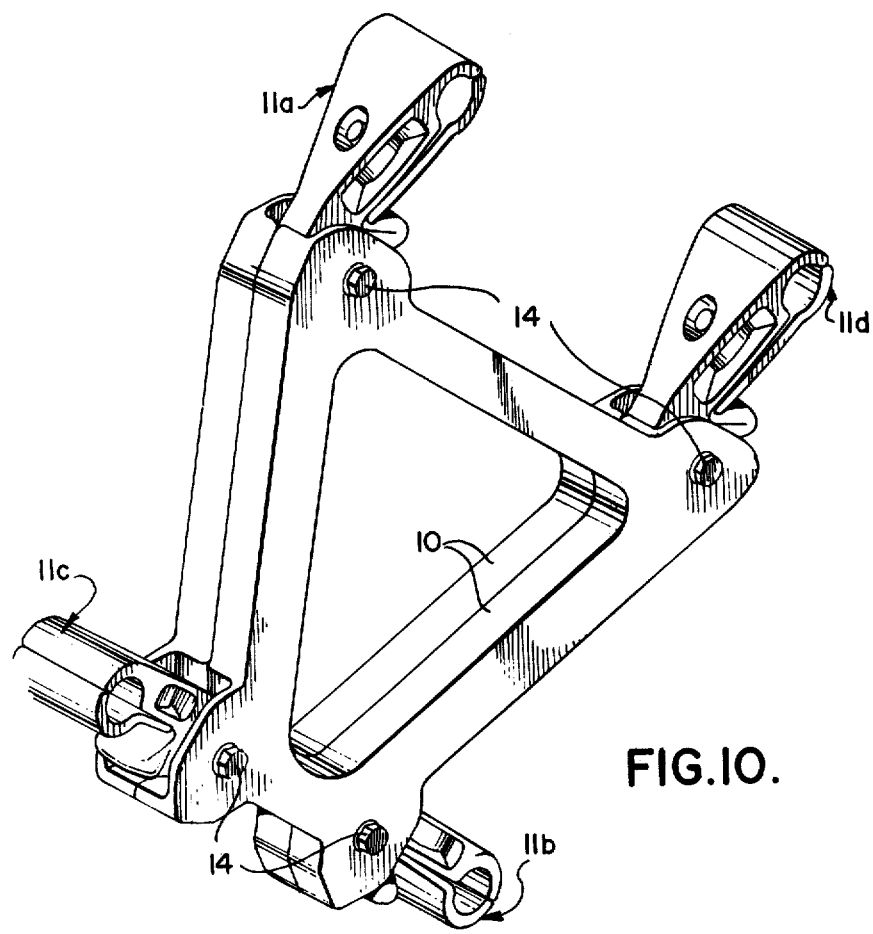
FIG. 10 is a perspective view of a fourth cable damper adapted for use with a conductor comprising four sub-conductors.

The second, third and fourth cable dampers illustrated in FIGS. 5, 6 and 10 are basically similar to the first, and will not be described in detail. The component parts of these cable dampers which correspond to parts shown in FIGS. 1 to 4 are denoted by corresponding reference numerals.

The second cable damper illustrated in FIG. 5 differs from the first in that it is adapted for use with a conductor bundle comprising three sub-conductors. Accordingly the main body constituted by the half shells 10 is in the form of a triangular frame which is adapted to lie in a generally vertical plane transverse to the sub-conductors. The cable damper illustrated in FIG. 6 is adapted for use with a conductor comprising four sub-conductors. In this case, the main body is in the form of a square frame which is also adapted to lie in a generally vertical transverse plane.

Figure 9:
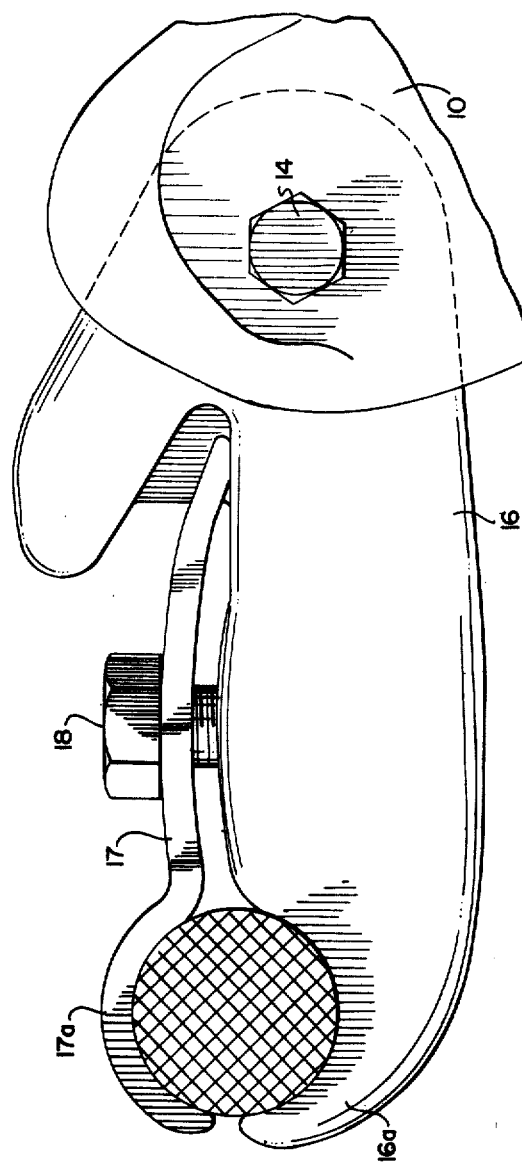
FIG. 9 is an enlarged elevational view showing details of a clamping arm.

The cable damper illustrated in FIG. 10 differs from the damper of FIG. 9 in that it is adapted to be used with four sub-conductors having a somewhat different configuration. In this case the main body is in the form of a trapezoidal frame having two diagonally opposed clamping arms 11a, 11b, which are adapted to engage a pair of sub-conductors (not shown) lying in a common vertical plane, and two other diagonally opposed clamping arms 11c, 11d which are adapted to engage another pair of sub-conductors (not shown) lying in a common horizontal plane. It will be noted that the clamping arms 11a and 11b are inclined at about 45° to the said vertical plane, and the clamping arms 11c and 11d are inclined at about 45° to the said horizontal plane, the arms being shown in their neutral positions.

Figure 11:
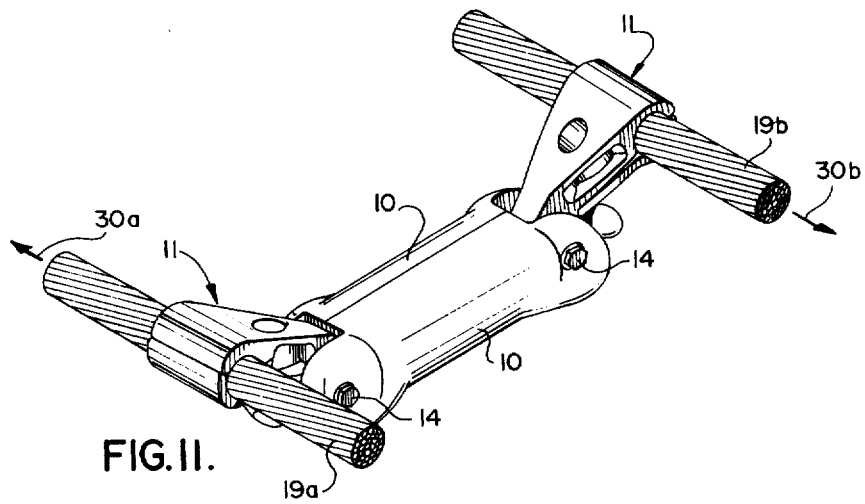
FIG. 11 is a 3-dimensional view illustrating the operating planes of a two bundle spacer damper of the present invention.

The relationship of the two bundle embodiment of the damper with respect to the sub-conductors 19a and 19b is shown in FIG. 11. In this embodiment the main body or half shells 10 depend below a horizontal plane defining the longitudinal axes of the sub-conductors 19a and 19b. The edge abutting surfaces of half shells 10 lie in the transverse vertical plane which divides the cable damper longitudinally into symmetrical sections.

The clamping arms 11 may pivot subject to the energy absorbing characteristics provided by the resilient washers 12 about a horizontal axis coincident with the axis of the clamping bolt 14 wherein horizontal or aeolion vibrations in the subconductors will cause the clamping arms 11 to pivotally oscillate in the vertical plane. The angle which the clamping arms 11 define with respect to the horizontal plane, when in their neutral position is preferably about 45. However, the angle of inclination may extend between about 30° and about 60°, with 45° being the optimum angle. As indicated, if the angle of inclination is less than 30°, transverse vibrations may be insufficiently suppressed and if the angle of inclination is greater than 60° aeolian vibrations may be insufficiently suppressed. The damper, when installed, will lie in the transverse plane as shown in FIG. 11. However, due to variations in physical parameters of the cables, and environmental effects such as temperature cycling, the phenomenon known as differential longitudinal movement occurs in the sub-conductors 19a and 19b as shown schematically by arrows 30a and 30b respectively. The presence of differential longitudinal movement may introduce a twisting moment into the cable damper which moment will be appreciably absorbed by the annular resilient washers 12 shown in FIG. 1. The resilient washers 12 are installed with sufficient compression that the forces on the washer due to differential longitudinal moment will not remove any section of the washer from compression and the differential forces will, therefore, not affect its proper functioning of the spacer damper assembly.

Figure 12:
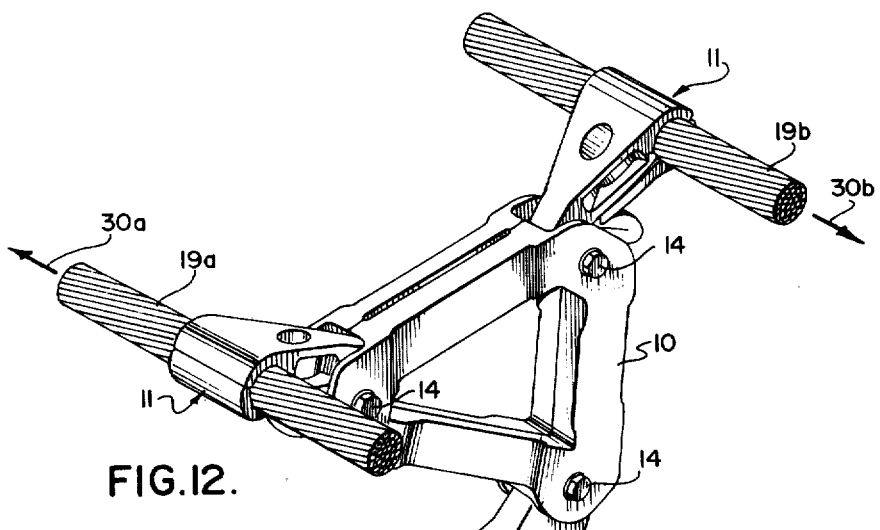
FIG. 12 is a 3-dimensional view illustrating the operating planes of a three bundle spacer damper of the present invention.

FIG. 12 illustrates an alternative orientation of another embodiment of the cable damper which is adapted for use with a conductor bundle comprising three sub-conductors 19a, 19b and 19c. Accordingly, the main body constituted by the half shells 10 is in the form of a triangular frame which is adapted to lie in a generally vertical plane transverse to the sub-conductors 19a, 19b and 19c. The oscillations of the clamping arm 11 caused by vibrations of the sub-conductors, are pivotal about the central axis of clamping bolts 14 and in the vertical plane.

The longitudinal axes of the sub-conductors 19a and 19b are disposed in the horizontal plane with conductor 19c spaced below and parallel to sub-conductors 19a and 19b. The clamping arms 11 are inclined to the common plane of the sub-conductors 19a and 19b. The inclination is such that the angle formed in the neutral or unstressed position by the axis of each clamping arm causes the axes of the clamping arms to be parallel to the longitudinal axes of the cables 19a and 19b. The arrangement illustrated tends to permit the introduction of a twisting moment into the compression of the washers but this will not affect the proper functioning thereof. Twisting moments may also be created by other combinations of sub-conductor pairs or by all three sub-conductors acting differentially to each other.

Figure 13:
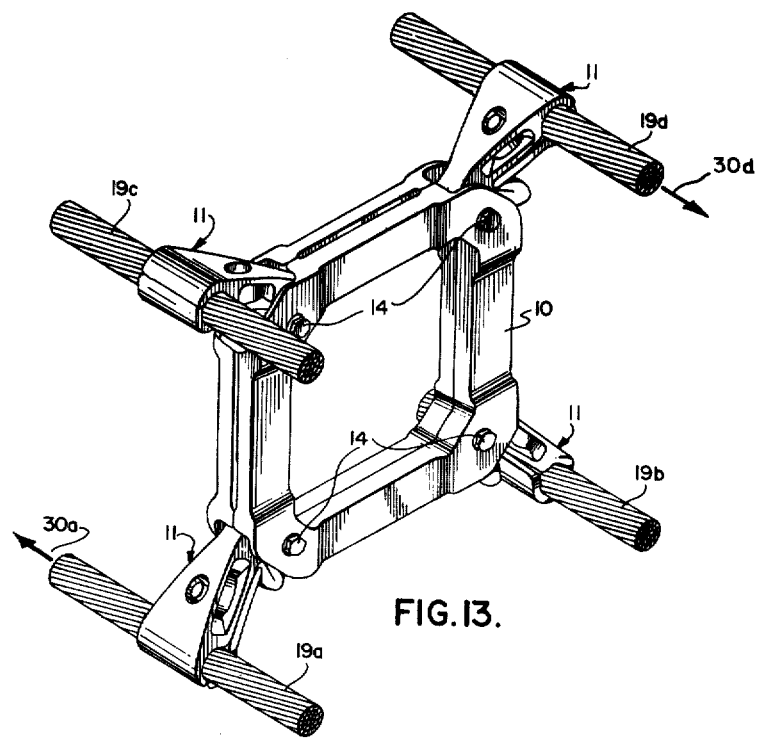
FIG. 13 is a 3-dimensional view illustrating the operating planes of a four bundle spacer damper of the present invention.

The cable damper shown in FIG. 13 is constructed for use with four sub-conductors spaced in the form of a square such that each sub-condcutor occupies a corner of the square. The half shells 10 or main body are also in the form of a rough square and lie in the vertical transverse plane. The longitudinal axes of the sub-conductors 19a and 19b lie in a horizontal plane. As in the embodiment shown in FIG. 12, the axes of the clamping arms 11 passing through the centres of the respective sub-conductors and the pivotal axes in the neutral position are inclined at 45° to the horizontal plane. Similarly, as in FIG. 12, twisting moments may be imposed on the frame due to differential longitudinal movement of the sub-conductors schematically illustrated for only two sub-conductors by arrows 30a and 30d. However, it is possible for differential longitudinal forces to develop in all four conductors simultaneously.

Figure 14:
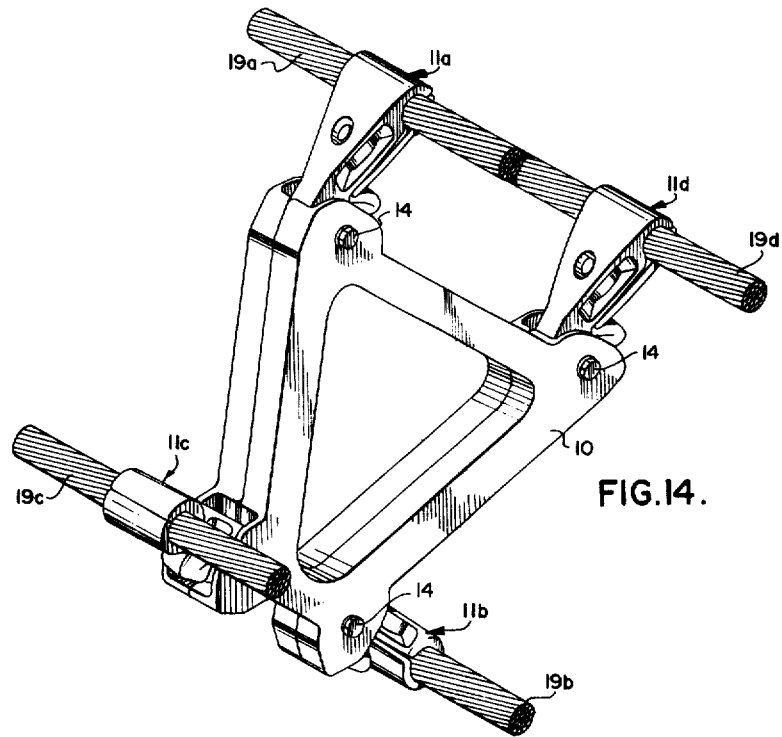
FIG. 14 is a 3-dimensional view illustrating the operating planes of a four bundle spacer damper of diamond configuration of the present invention.

The cable damper shown in FIG. 14 is structured for use with four sub-conductors arranged in the form of a square such that a diagonal of the square passing transversely through the centres of the sub-conductors 19c and 19d lies in a horizontal plane. In the embodiment of FIG. 14 the main body takes the form of an equilateral trapezoid. The clamping arms 11 form an angle in the unbiased condition of 45° with the horizontal plane.

It will be apparent from the foregoing that the cable damper and associated energy absorbing means disclosed herein represent a significant advance in the electrical hardware art which should result in clear benefits to the industry and public generally.

We claim:

1. A cable damper for an aerially suspended conductor in bundled configuration, comprising:
   a hollow rigid main body,
   a plurality of clamping arms, one for each sub-conductor of the conductor bundle, pivotally mounted on the main body, the clamping arms being pivotally mounted on the main body by pivotal mountings which allow for pivotal movement of the arms about predetermined axes parallel to the sub-conductors to be held by the arms,
   the pivotal mountings for the arms including resilient energy absorbing means biasing the arms into neutral positions,
   the main body consisting of a pair of complementary half shells clamped together in edge abutting relation by clamping bolts, and the edges of the half shells being formed with co-operating recesses defining openings through which the clamping arms extend.

2. A cable damper according to claim 1, in which the half shells are light metal castings.

3. A cable damper according to claim 2, in which the half shells are of aluminum.

4. A cable damper according to claim 1, in which said openings define abutment edges adapted to engage said clamping arms for limiting the range of pivotal movement thereof.

5. A cable damper according to claim 1, comprising a pair of clamping arms which, in their neutral positions, are inclined to the common plane of the sub-conductors that they are adapted to engage.

6. A cable damper according to claim 1, wherein the main body is constructed as a hollow beam having a pair of clamping arms pivotally mounted thereon, said arms in their neutral positions being inclined to the common plane of the sub-conductors that they are adapted to engage.

7. A cable damper according to claim 6, wherein the neutral positions of the clamping arms are such that the axis of each arm passing through the centre of the sub-conductor to be clamped and the pivotal axis of the arm lies at an inclination of between 30° and 60° to said common plane.

8. A cable damper according to claim 7, wherein the neutral positions of the clamping arms are such that the axis of each arm passing through the centre of the sub-conductor to be clamped and the pivotal axis of the arm is inclined at about 45° to said common plane.

9. A cable damper according to claim 1, wherein each clamping arm comprises a pair of clamp members adapted to hold a sub-conductor therebetween and means securing the clamp members together, one of the clamp members being a rigid unitary body having a first, conductor-engaging portion and a second portion engaging said pivotal mounting, and the other clamp member being a resilient plate of flat leaf spring-like section secured to the first member by said securing means.

10. A cable damper according to claim 9, wherein said one clamp member is an aluminum casting and the other clamp member is a resilient steel plate.

11. A cable damper according to claim 10, wherein said securing means is a clamping bolt having a screw-threaded portion engaging a threaded hole in said one clamp member, the screw-threaded portion being provided with a nylon patch producing an interference fit between the clamping bolt and the threaded hole.

12. A cable damper according to claim 1, adapted for use with a conductor comprising at least three sub-conductors, wherein the main body is in the form of a polygonal frame adapted to lie in a generally vertical plane transverse to the subconductors, each pair of clamping arms being inclined at about 45° to the common plane of the sub-conductors which the arms are adapted to engage.

13. A cable damper for an aerially suspended conductor in bundled configuration, comprising:
a hollow rigid body,
said main body consisting of a pair of complementary metallic half shells clamped together in edge abutting relation,
a plurality of clamping arms, one for each sub-conductor of the conductor bundle, pivotally mounted on the main body,
the clamping arms being pivotally mounted on the main body so as to permit pivotal movement of the arms only about predetermined axes parallel to the sub-conductors to be held by the arms, and resilient energy absorbing means biasing the arms into respective neutral positions,
a plurality of bolts passing axially through the pivotal axis formed by said energy absorbing means,
the resilient energy absorbing means comprising a plurality of pairs of annular washers of elastomeric material, the washers of each pair being mounted on a respective one of said bolts and located thereby between opposed surfaces of a clamping arm and respective adjacent surfaces of the main body in the area of pivotal connection thereof so as to prevent contact of said surfaces in operation,
each washer being of a thickness sufficient to provide a compression factor to substantially preclude slippage as between the surfaces of the washer and the surfaces of the clamping arm and main body when pivotal movement occurs.

14. A cable damper according to claim 13, wherein the washers are of semi-conducting elastomeric material.

15. A cable damper according to claim 13, wherein the washers are of semi-conducting synthetic polyisoprene.

16. A cable damper according to claim 15, wherein the faces of each washer are provided with deformations gripping with mating surfaces on the clamping arm and the main body.

17. A cable damper according to claim 16, wherein the deformations on the faces of the washers are radial corrugations and the co-operating surfaces of the clamping arms and main body have mating corrugations receiving the corrugations of the washers in gripping relationship.

18. A cable damper according to claim 13, in which the half shells are light metal castings.

19. A cable damper according to claim 13, in which the half shells are of aluminum.

20. A cable damper according to claim 13, in which said openings define abutment edges adapted to engage said clamping arms for limiting the range of pivotal movement thereof.

21. A cable damper according to claim 13, comprising a pair of clamping arms which, in their neutral positions, are inclined to the common plane of the sub-conductors that they are adapted to engage.

22. A cable damper according to claim 13, wherein the main body is constructed as a hollow beam having a pair of clamping arms pivotally mounted thereon, said arms in their neutral positions being inclined to the common plane of the sub-conductors that they are adapted to engage.

23. A cable damper according to claim 13, wherein the neutral positions of the clamping arms are such that the axis of each arm passing through the centre of the sub-conductor to be clamped and the pivotal axis of the arm lies at an inclination of between 30° and 60° to said common plane.

24. A cable damper according to claim 13, wherein the neutral positions of the clamping arms are such that the axis of each arm passing through the centre of the sub-conductor to be clamped and the pivotal axis of the arm is inclined at about 45° to said common plane.

25. A cable damper according to claim 13, wherein each clamping arm comprises a pair of clamp members adapted to hold a sub-conductor therebetween and means securing the clamp members together, one of the clamp members being a rigid unitary body having a first, conductor-engaging portion and a second portion engaging said pivotal mounting, and the other clamp member being a resilient plate of flat leaf spring-like section secured to the first member by said securing means.

26. A cable damper according to claim 25, wherein said one clamp member is an aluminum casting and the other clamp member is a resilient steel plate.

27. A cable damper according to claim 26, wherein said securing means is a clamping bolt having a screw-threaded portion engaging a threaded hole in said one clamp member, the screw-threaded portion being provided with a nylon patch producing an interference fit between the clamping bolt and the threaded hole.

28. A cable damper for an aerially suspended conductor in bundled configuration, comprising a rigid metallic body having a plurality of clamping arms pivotally connected thereto for pivotal movement about predetermined axes parallel to the sub-conductors of a conductor bundle, each clamping arm providing in the region of its pivotal connection to the metallic body a pair of front and rear surfaces extending transversely to the respective axis, each of said front and rear surfaces being disposed in facing relation to respective surface portions of the metallic body, there being disposed between each of said front and rear surfaces and the respective surface portion of the metallic body a generally disc-shaped spacer of semi-conducting synthetic polyisoprene which is compressed axially between the clamping arm and the respective surface portion of the body, whereby to bias the clamping arm into a neutral position.

29. A cable damper for an aerially suspended conductor in bundled configuration, comprising a rigid metallic body having a plurality of metallic clamping arms adapted to engage respective sub-conductors of the conductor bundle, said clamping arms being pivotally connected to the main body by pivot mountings adapted to permit pivotal movement of the clamping arms about predetermined axes parallel to the sub-conductors, said pivot mountings including resilient energy absorbing means adapted to damp vibrational movements of the clamping arms, and each said energy absorbing means comprising a replaceable element of semi-conducting synthetic polyisoprene which is frictionally engaged between relatively movable surfaces of a clamping arm and the main body.

30. A cable damper for an aerially suspended conductor in bundled configuration comprising a rigid main body having a plurality of clamping arms pivotally connected thereto with resilient energy absorbing means adapted to damp vibrational movements of the clamping arms, characterized in that the main body consists of a pair of complementary half shells clamped together in edge abutting relation by clamping bolts.

31. A cable damper for an aerially suspended conductor in bundled configuration, comprising:
   a main body,
   a plurality of clamping arms, one for each subconductor of the conductor bundle, pivotally connected to said main body; and
   resilient energy absorbing means biasing said clamping arms toward respective neutral positions relative to said main body;
   said resilient energy absorbing means comprising a plurality of pairs of annular washers of elastomeric material;
   each of said pairs of annular washers being compressed between opposite surfaces of a respective one of said clamping arms and opposed surfaces of said main body;
   said washers each being of a thickness sufficient to preclude slippage between said washers and said surfaces of said clamping arms and said main body; and
   said elastomeric material being a semi-conducting synthetic polyisoprene.

32. A cable damper according to claim 31, and further comprising:
   a plurality of bolts extending respectively through said clamping arms, said main body comprising separate main body parts clamped against said washers by said bolts;
   said washers extending coaxially around said bolts and being spaced from said bolts radially of said bolts by annular air gaps.

* * * * *